Nov. 11, 1941.                J. H. HAMMOND, JR                    2,262,457
                              SIGNAL RECEIVING SYSTEM
                              Filed Nov. 10, 1936           4 Sheets—Sheet 1

INVENTOR
JOHN HAYS HAMMOND, JR.
BY
ATTORNEY

Nov. 11, 1941.  J. H. HAMMOND, JR  2,262,457
SIGNAL RECEIVING SYSTEM
Filed Nov. 10, 1936    4 Sheets-Sheet 3

INVENTOR
JOHN HAYS HAMMOND, JR.
BY
ATTORNEY

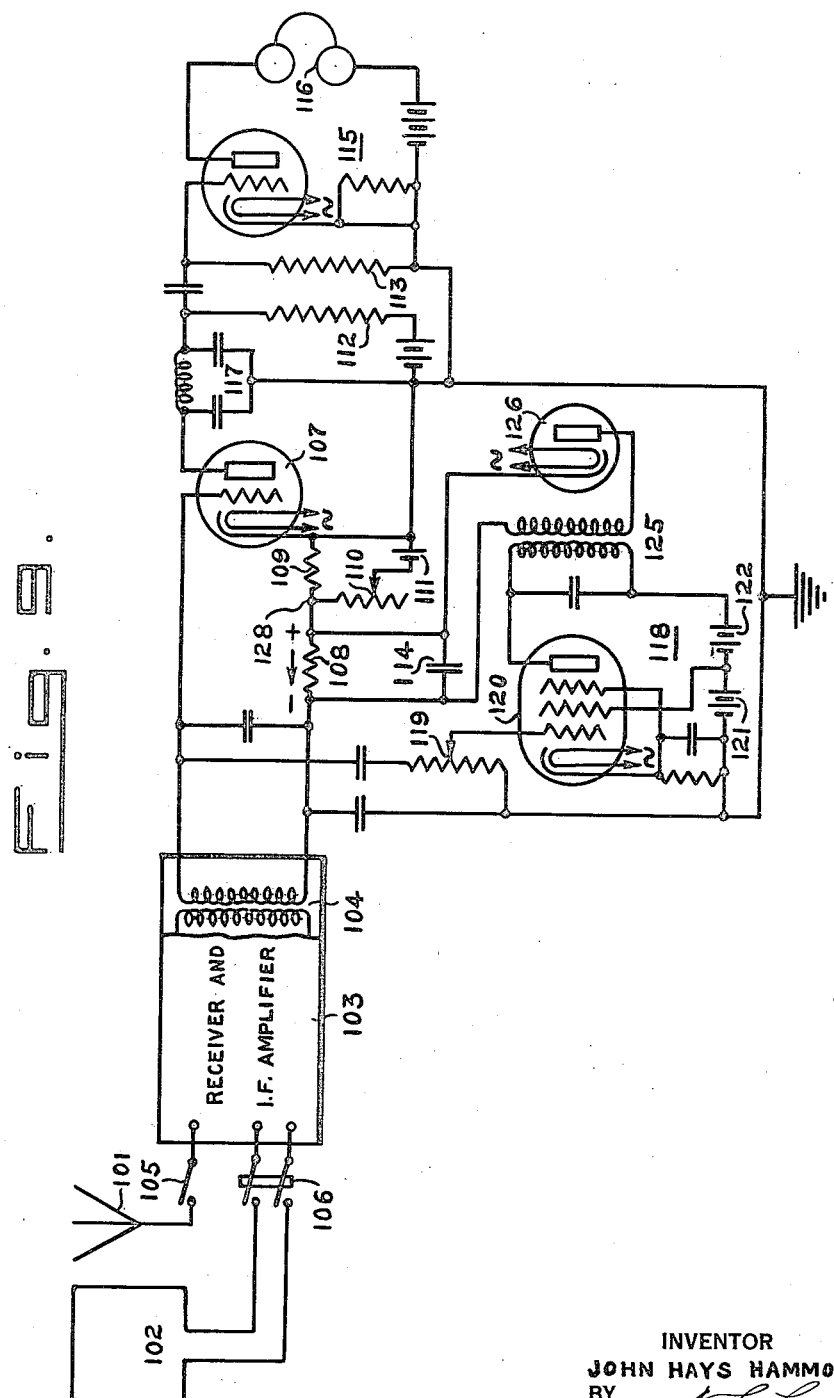

Patented Nov. 11, 1941

2,262,457

UNITED STATES PATENT OFFICE 2,262,457

SIGNAL RECEIVING SYSTEM

John Hays Hammond, Jr., Gloucester, Mass.

Application November 10, 1936, Serial No. 110,044

2 Claims. (Cl. 177—352)

This invention relates to directive signal receiving systems of the type responsive to variations in signal intensity, such as radio compasses, airplane radio beam receivers, direction indicators, systems for locating ships, or the like.

An object of this invention is to increase the sensitivity and accurateness of the above systems.

Another object is to facilitate the operation of such systems by unskilled persons.

Another object is to provide a system in which differences in signal strength are accentuated so that small changes in intensity are easily observed.

Another object is to provide a simple, dependable, accurate and efficient system for the above purpose.

Other objects and advantages will be apparent as the nature of the invention is more fully disclosed.

A feature of the invention consists in the provision, in a signal receiving system, of a transmission channel having characteristics controlled by the signal to accentuate the variations in signal strength. The transmission channel may include an amplifier having a control means to vary the gain ratio in proportion to changes in signal strength or an attenuation network having an impedance which varies in accordance with changes in signal strength.

A further feature consists in the provision of a differential audibility accentuator which may be connected in a system of the above type to increase the sensitivity and accuracy thereof.

Other features consist in the various details of construction and combinations of parts hereinafter more fully set forth.

Although the novel features which are believed to be characteristic of this invention will be particularly pointed out in the claims appended hereto, the invention itself, as to its objects and advantages, the mode of its operation and the manner of its organization, may be better understood by referring to the following description taken in connection with the accompanying drawings forming a part thereof, in which—

Fig. 1 illustrates diagrammatically the invention as applied to the reception and reproduction of directional signals, Fig. 2 is a schematic diagram of an accentuator circuit which may be used in conjunction with the system of Fig. 1, Fig. 3 is a series of curves showing the use of the invention in connection with a radio beacon system, Fig. 4 is a schematic diagram of another accentuator circuit, which may be used in conjunction with the system of Fig. 1, Fig. 5 is a series of curves showing the relation between the input signal strength and the gain ratio, Fig. 6 is a schematic diagram of still another form of accentuator circuit.

Fig. 9 is a schematic diagram illustrating a further embodiment of the invention.

Like reference characters denote like parts in the several figures of the drawings.

In the following description and in the claims parts will be identified by specific names for convenience, but they are intended to be as generic in their application to similar parts as the art will permit.

Figure 1:
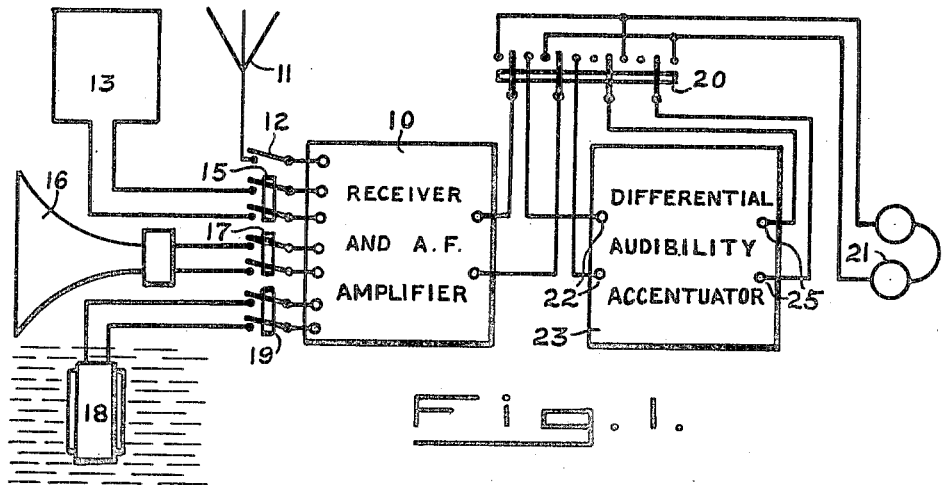

Referring more particularly to the drawings, Fig. 1 shows a radiant energy receiver and audio frequency amplifier 10 which receives energy from either an open antenna 11 through a single-pole switch 12, or a loop antenna 13 through a double-pole switch 15, or an acoustic sound receiver 16 through a double-pole switch 17, or a submarine sound receiver 18 through a double-pole switch 19. The open antenna 11 may be of any suitable type, such as that used on airplanes for receiving the A—N course signals. The loop antenna 13 may be of the type generally used in radio direction finders and is mounted for rotation about its vertical axis in the usual manner. The acoustic sound receiver 16 may be of the type developed for locating the position of unseen aircraft by the sound of their motors and may be of the single or multiple type as desired. The sound receiving horn or horns are so mounted that they may have their axes pointed in any desired direction in space. The submarine sound receiver 18 may be of the type used to receive audio frequency signals transmitted through the water from a lightship or other vessel and may be of the type shown in Fig. 2 of my U. S. Patent 1,690,579, dated November 6, 1928.

The output circuit of the receiver and audio frequency amplifier 10 is connected to two poles of a four-pole, double-throw switch 20. When the switch 20 is thrown to the left the output circuit of the amplifier 10 is connected directly to a set of head phones 21 or to any other suitable sound reproducing or indicating device. When the switch 20 is thrown to the right the output circuit of the amplifier 10 is connected to the input terminals 22 of a differential auibility accentuator 23, the output terminals 25 of which are connected through the other poles of the switch 20 to the head phones 21.

Figure 2:
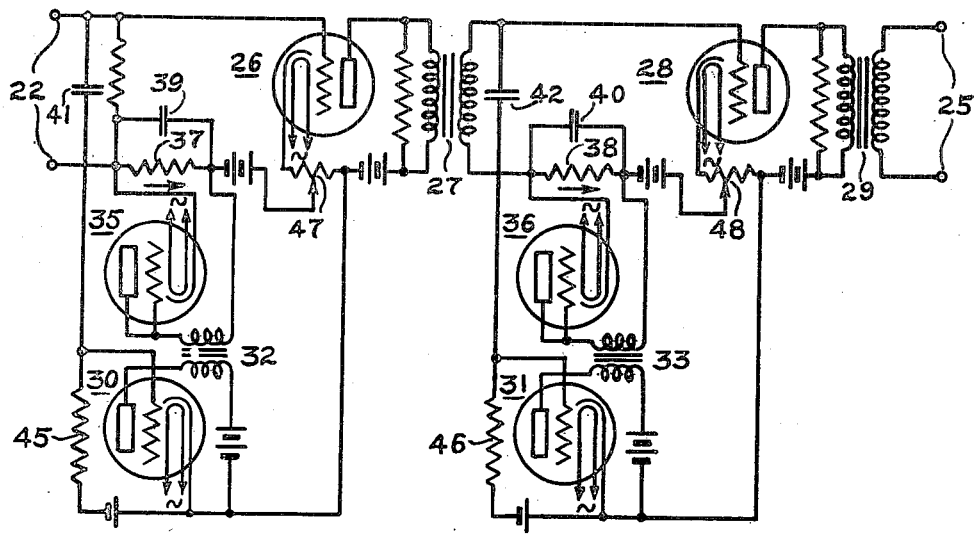

In Fig. 2 is shown a form of differential audibility accentuator which may be used in connection with the system of Fig. 1. In this circuit the input terminals 22 are connected in the input circuit of a space discharge amplifier tube 26 the output circuit of which is connected through a transformer 27 to the input circuit of a second space discharge amplifier tube 28, the output circuit of which is connected through a transformer 29 to the output terminals 25.

Across the input circuits of the amplifier tubes 26 and 28 are connected the input circuits of two amplifier tubes 30 and 31 respectively. The output circuits of these amplifier tubes are connected through transformers 32 and 33 respectively to rectifiers 35 and 36. The output circuits of these rectifiers are connected across resistors 37 and 38, which are located in the grid returns of the amplifier tubes 26 and 28 respectively. These resistors are shunted by condensers 39 and 40 respectively. Blocking condensers 41 and 42 are in the grid leads of the amplifier tubes 30 and 31 and high resistances 45 and 46 are connected between the grids and cathodes of these tubes. The grid returns of the amplifier tubes 26 and 28 are connected to potentiometers 47 and 48 respectively.

The various tubes are provided with sources of filament current, grid potential and space current in a well known manner. Only so much of the circuits have been shown and described as is necessary to an understanding of the present invention.

In the operation of the form of the invention shown in Fig. 1, where it is desired to use the set in the usual manner without the use of the differential audibility accentuator 23, the four-pole switch 20 is thrown to the left, thus connecting the output circuit of the receiver and audio frequency amplifier 10 to the head phones 21. If the system is to be used in an airplane following the standard A—N course beacon the single-pole switch 12 is closed thus connecting the open antenna 11 to the input circuit of the audio frequency amplifier 10.

Figure 3:
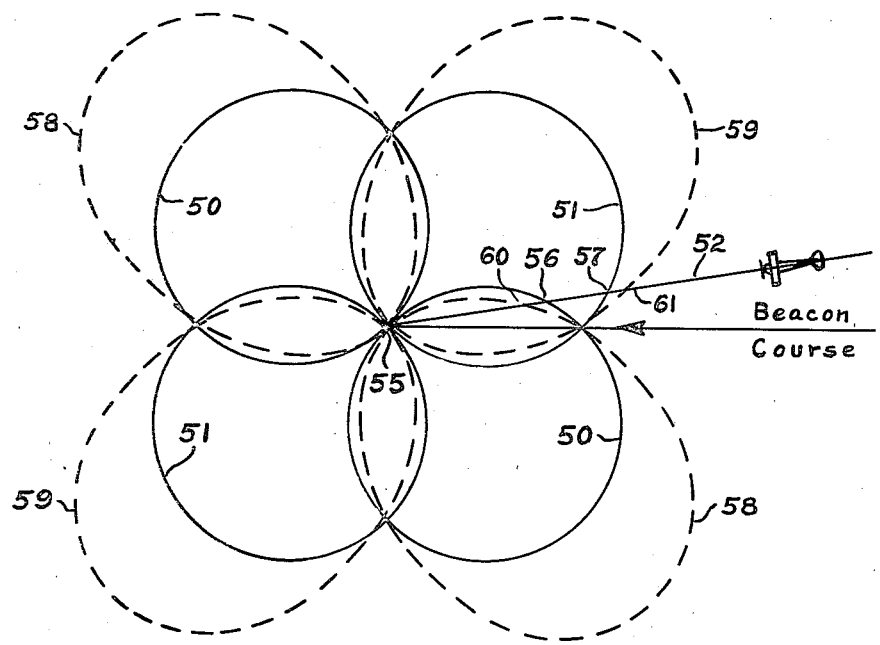

Fig. 3 depicts the intensity of the signals in the head phones 21, without the use of the differential audibility accentuator 23, the loops 50 representing the A signals and the loops 51 the N signals. If the airplane is off course say 10° and is flying along the line 52 the intensity of the A signal received will be represented by the length of the line 55—56 and of the N signal by the line 55—57. The difference in the lengths of these two lines 56—57 will represent the difference in intensity between the A and N signals without the use of the differential audibility accentuator 23.

When it is desired to accentuate the difference between the A and N signals the switch 20 is thrown to the right thus connecting the output circuit of the receiver and audio frequency amplifier 10 to the input terminals 22 of the differential audibility accentuator 23, and connecting the output terminals 25 of the differential audibility accentuator 23 to the phones 21.

In this case the energy from the output circuit of the receiver and audio frequency amplifier 10 passes through the switch 20 and terminals 22 to the amplifier 26. At the same time some of the energy passes to the amplifier 30 where it is amplified and passes through the transformer 32 to the rectifier 35. Here the energy is rectified and flows in the direction of the arrow through the resistor 37. This causes a positive potential to be built up at the left-hand end of the resistor 37, which acts to decrease the negative bias on the grid of the amplifier tube 26, thus increasing the gain ratio of the amplifier 26. In this way the amplification will vary in accordance with the signal strength, being greater for strong signals than for weak ones. The amplifier 28 operates in a similar manner to further vary the amplification in accordance with signal strength.

The loops 58 in Fig. 3 depict the intensity of the A signals and the loops 59 depict the intensity of the N signals in the head phones 21, with the differential audibility accentuator 23 in the circuit. With the airplane flying along the line 52 the intensity of the A signals received will be represented by the length of the line 55—60 and of the N signals by the length of the line 55—61. The difference in the lengths of these two lines 60—61 will represent the difference in intensity between the A and N signals with the differential audibility accentuator 23 in the circuit.

It is thus evident that by the use of the differential audibility accentuator it is possible to greatly increase the difference in intensity between the A and N signals for any given deviation of the airplane from its beacon course. The invention therefore makes it possible for the pilot to maintain his airplane on the beacon course with much greater accuracy than with the usual system now employed for such purposes.

The receiver 10 is preferably provided with an automatic or manual volume control to maintain the average output intensity of the combined A—N signal fairly constant as the plane approaches the transmitter along the beam. In order to make the signal comparable either with or without the differential audibility accentuator the constants of the various transformers, resistors, etc. shown in Fig. 2 may be selected so that there will be no over all gain between the input terminals 22 and the output terminals 25 of the differential audibility accentuator 23 for this average combined signal. If the plane is slightly off the beam course however the difference in intensity between the A and the N signals will be greatly accentuated. For example the A signal will be stronger and the N signal will be weaker than without the accentuator 23 or vice versa, while the total energy is not greatly changed.

Figure 4:
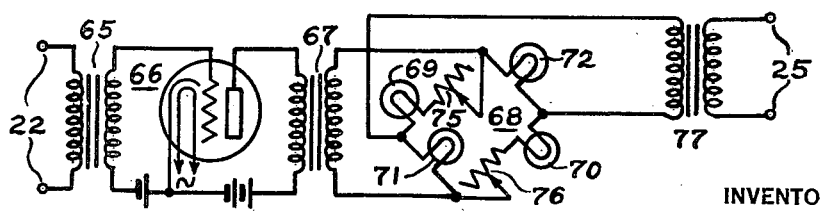

A different differential audibility accentuator form is shown in Fig. 4 in which the input terminals 22 are connected through a transformer 65 to a space discharge amplifier 66. The output circuit of the amplifier 66 is connected through a transformer 67 to two terminals of an attenuation network comprising a resistance bridge 68, having two carbon filament lamps 69 and 70 and two tungsten filament lamps 71 and 72. Two variable resistances 75 and 76 are connected in series with the carbon filament lamps 69 and 70. The other terminals of the bridge 68 are connected through a transformer 77 to the output terminals 25.

In the operation of this form of the invention the signal received at the input terminals 22 passes through the transformer 65 and is amplified by the amplifier 66. The output of this amplifier passes through the transformer 67 to the bridge 68. Here the energy is divided, part passing through the potentiometer 75, carbon filament lamp 69 and tungsten filament lamp 71, and the other part passing through the tungsten filament lamp 72, carbon filament lamp 70 and potentiometer 76.

The resistance of the tungsten lamps 71 and 72 increases with the increase of heating current passing through the filaments and the resistance of the carbon lamps 69 and 70 decreases with increase of filament current. The balance of the bridge 68 is therefore upset in proportion to the amount of energy received, so that the energy passing from the attenuation network to the output terminals 25 will vary in a greater degree than the input energy.

Figure 5:
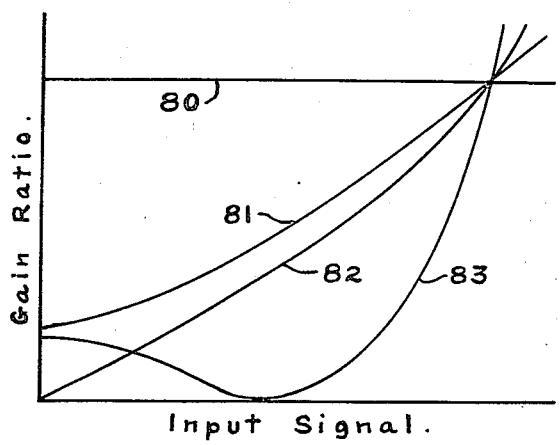

The relative attenuation in the network of Fig. 4 under various conditions is depicted in Fig. 5. In this figure the straight line 80 shows the attenuation without the use of the differential audibility accentuator. It will be noted that the attenuation is constant under these conditions. Curve 81 shows the attenuation when the potentiometers 75 and 76 are set so that the bridge 68 is always out of balance. Curve 82 depicts the attenuation when the potentiometers 75 and 76 are set so that the bridge 68 is in balance when the input signals are very weak. Curve 83 shows the attenuation when the potentiometers 75 and 76 are set so that the bridge 68 is balanced when the input signal is at about half the working signal. It is thus seen from Fig. 5 that within certain limits a wide range of relationship between the attenuation for strong and weak input signals may be obtained, so that the change of audibility may be greatly accentuated over that which would be obtained without the use of the differential audibility accentuator.

Figure 6:
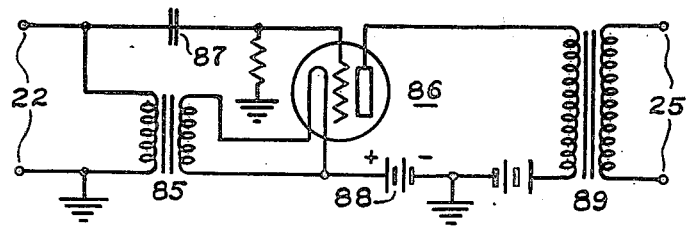

In Fig. 6 is shown another modification of the differential audibility accentuator 23 in which the input terminals 22 are connected through a transformer 85 to the filament circuit of a space discharge amplifier 86. One side of the primary of the transformer 85 is connected through a condenser 87 to the grid of the amplifier 86. A battery 88 is inserted in the plate return circuit in order to always maintain the filament positive with respect to the grid. The output circuit of the amplifier 86 is connected through a transformer 89 to the output terminals 25.

In the operation of this form of the invention part of the input signal passes through the condenser 87 to the grid of the amplifier 86 and the remainder of the signal passes through the transformer 85 to the filament of the amplifier 86. In this way there is produced a double control due to the change in heating of the filament and the change of potential on the grid, which causes a sharp rise of the gain ratio with increase of input signal strength. With this type of differential audibility accentuator the curves 58 and 59 shown in dotted lines in Fig. 3 would be greatly elongated, thus producing a greater difference in audibility between the A and the N signals than that produced with the use of circuits shown in Figs. 2 and 4.

Figure 7:
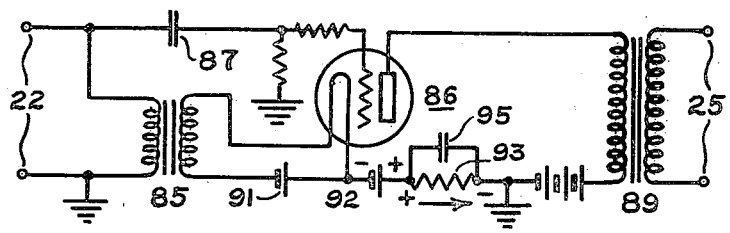
Fig. 7 is a schematic diagram of a modification of the circuit shown in Fig. 6.

In Fig. 7 is shown a modification of the circuit shown in Fig. 6 in which a filament heating battery 91 has been added. The battery 88 has been replaced by a battery 92 with its negative pole connected to the filament of the amplifier 86. A resistor 93 shunted by a condenser 95 has been inserted in the plate return circuit.

In the operation of this form of the invention, with no input signal the filament is maintained at a low temperature, which slightly increases the sensitivity, and the grid is initially at a positive potential with respect to the filament which is sufficiently high to cut the gain ratio to a comparatively low value. With increase of input signal the filament current increases and the grid becomes less positive due to the current flowing through resistor 93 in the direction of the arrow which builds up a potential difference across this resistor. This opposes the potential of the battery 92 thus increasing the positive bias of the cathode with respect to ground and decreasing the positive bias of the grid with respect to the cathode, thereby causing the gain ratio of the amplifier 86 to increase very rapidly with increase of input signal strength up to a value corresponding to the maximum output of the tube. In this way the audibility differential will be greatly accentuated over that produced with the circuit shown in Fig. 6.

When it is desired to use the loop antenna 13 the switch 15 only is closed thus connecting this antenna to the receiver 10. If it is not desired to use the differential audibility accentuator, the switch 20 is thrown to the left thus connecting the head-phones 21 to the output circuit of the receiver 10.

Figure 8:
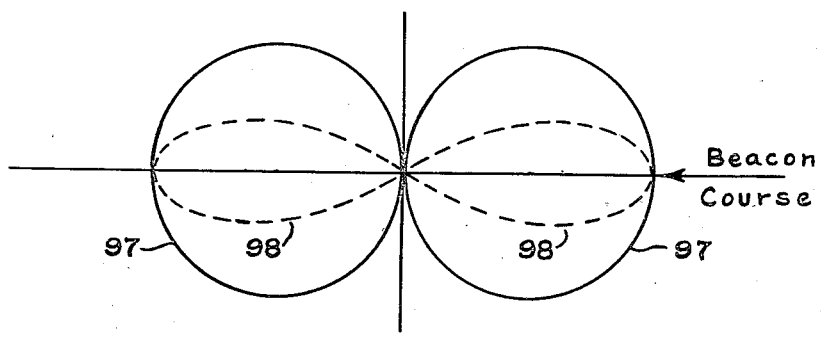
Fig. 8 is a series of curves showing audible signal strengths.

The loops 97, shown in Fig. 8, depict the intensity of the signals in the head phones 21 when using the loop antenna without the use of the differential audibility accentuator 23. It is seen from these loops that the airplane may be considerably off course before there is a noticeable diminution in the intensity of the signals in the head phones 21.

When the switch 20 is thrown to the right, to connect the differential audibility accentuator 23 in the circuit, the loops 98 will represent the intensity of the signals in the head phones 21. In this case it is seen that the intensity of the signals drops off very rapidly when the airplane gets off course, so that it is possible for the pilot to maintain his course with greater accuracy.

If it is desired to use the acoustic sound receiver 16 the switch 17 only is closed, thus connecting the pick-up of this instrument to the receiver 10. When it is desired to use the submarine sound receiver 18 the switch 19 only is closed. In either case, as the pick-up instrument 16 or 18 is oriented in the direction from which the sound is coming, the intensity of the signals in the head phones 21 will increase, this increase being very much more rapid when the differential audibility accentuator is in the circuit than when it is not, so that it is possible to locate the source of sound with much greater accuracy than when the differential audibility accentuator is not used.

In the modified form of the invention shown in Fig. 9 an open antenna 101 and a loop antenna 102 are connected to the input circuit of a radio receiver and intermediate frequency amplifier 103, by means of a single-pole switch 105 and a double-pole switch 106 respectively. The output circuit of the intermediate frequency amplifer is connected through a transformer 104 to the input circuit of a space discharge detector device 107 in the grid return of which are two resistors 108 and 109. The resistor 109 is shunted by a rheostat 110 and a battery 111 in series. The output circuit of the device 107 is connected by a resistance coupling 112—113 to the input circuit of an audio frequency amplifier 115, the output circuit of which is connected to the head phones 116. Across the output circuit of the device 107 is a filter network 117 which absorbs high frequencies, but allows audio frequencies to pass.

The secondary of the transformer 104 is also connected to the input circuit of an auxiliary intermediate frequency amplifier 118 through a voltage divider 119. The amplifier 118 may comprise a pentode tube 120 with suitable power supply and bias circuits including batteries 121 and 122. The first grid of the tube 120 is connected to the adjustable contact of the voltage divider 119, the second grid is connected to the junction between the batteries 121 and 122 and the third grid is connected to the cathode. The output circuit of the amplifier 118 is connected through a transformer 125 to a rectifier 126. The output circuit of this rectifier is connected across the resistor 108, shunted by a condenser 114.

In the operation of this form of the invention the switch 105 is closed when it is desired to use the open antenna 101 to receive the A—N radio beacon signals and the switch 106 is closed when it is desired to use the loop antenna 102 as a radio direction finder.

In either case the received energy is amplified by the receiver and amplifier 103 and passes through the transformer 104 to the space discharge device 107.

In the absence of signal the bias on the grid of the device 107 is dependent upon the potential of the point 128, which is dependent on the current flowing through the resistor 109 from the battery 111, and is determined by the setting of rheostat 110. This bias is so adjusted that the device 107 acts very poorly as a detector.

As energy passes through the intermediate frequency transformer 104, a part passes to the auxiliary amplifier 118 which operates only on intermediate frequencies. Here the energy is amplified and passes through the transformer 125 to the rectifier 126 where it is rectified and passes through the resistor 108 in the direction of the arrow, thus building up a potential difference across this resistor which is proportional to the input signal strength.

With weak signals this potential difference is small so that the grid of the device is made only slightly more negative, so that it acts poorly as a detector. The intermediate frequency energy from the transformer 104 which passes through the device 107 is eliminated by the filter 117 so that only a very small amount of energy passes to the head phones 116.

As the signal strength increases the potential difference across the resistor 108 will increase until with strong signals the negative bias on the grid of the device 107 is increased to such an extent that it functions much better as a detector. The output energy of the device 107 then includes audio frequency which passes through the filter 117 to the audio frequency amplifier 115, where it is further amplified and passes to the head phones 116.

It is thus seen that with weak signals the device 107 acts poorly as a detector, so that very little energy is received by the head phones 116, while with strong signals the device 107 acts well as a detector, the audio frequency output of which passes through the filter 117 and is received in the head phones 116 as a very strong signal. In this way a very much greater accentuation of the signals is produced in the head phones than that produced by the ordinary methods of amplification.

Although only a few of the various forms in which this invention may be embodied have been shown herein, it is to be understood that the invention is not limited to any specific construction and that various changes or modifications may be made therein without departing from the spirit of the invention or the scope of the appended claims.

What is claimed is:

1. In a directive signal receiving system of the type responsive to variations in signal strength to indicate orientation or position with respect to the signal source, signal pick-up means, signal reproducing means actuated in accordance with the strength of signal received by said pick-up means, a transmission channel for transferring energy from said pick-up means to said reproducing means, a variable attenuator in said channel comprising an impedance bridge including resistances having a negative coefficient and resistances having a positive coefficient, said resistances being connected to attenuate weak signals more in proportion than strong signals whereby the variations in signal strength are accentuated.

2. In a directive signal receiving system of the type responsive to variations in signal strength to indicate orientation or position with respect to the signal source, signal pickup means, signal reproducing means actuated in accordance with the strength of signal received by said pickup means, a transmission channel for transferring energy from said pickup means to said reproducing means, a variable attenuator in said channel comprising an impedance bridge including resistances having dissimilar coefficients of resistance, said resistances being connected to attenuate weak signals more in proportion than strong signals whereby the variations in signal strength are accentuated.

JOHN HAYS HAMMOND, Jr.